United States Patent [19]

Williams

[11] Patent Number: 4,986,929
[45] Date of Patent: Jan. 22, 1991

[54] NOVEL ISOCYANATE BLENDS

[75] Inventor: Gregory D. Williams, Pittsburgh, Pa.

[73] Assignee: Mobay Corporation, Pittsburgh, Pa.

[21] Appl. No.: 523,142

[22] Filed: May 14, 1990

Related U.S. Application Data

[63] Continuation of Ser. No. 398,201, Aug. 23, 1989, abandoned.

[51] Int. Cl.$^5$ .................... C08G 18/10; C08G 18/12
[52] U.S. Cl. ................... 252/182.22; 521/159; 252/182.21
[58] Field of Search ............. 252/182.22; 521/159

[56] References Cited

U.S. PATENT DOCUMENTS

| | | | |
|---|---|---|---|
| 3,384,653 | 5/1968 | Erner et al. | 260/453 |
| 3,644,457 | 2/1972 | Konig et al. | 260/453 |
| 4,031,026 | 6/1977 | Ibbotson | 252/182 |
| 4,065,410 | 12/1977 | Schafer et al. | 260/2.5 |
| 4,154,752 | 5/1979 | Sundermann et al. | 260/453 |
| 4,261,852 | 4/1981 | Carroll et al. | 252/182.22 |
| 4,321,333 | 3/1982 | Alberino et al. | 521/159 |
| 4,448,903 | 5/1984 | Liang et al. | 521/137 |
| 4,477,602 | 10/1984 | Liang et al. | 521/137 |

*Primary Examiner*—Harold D. Anderson
*Assistant Examiner*—Dennis R. Daley
*Attorney, Agent, or Firm*—Joseph C. Gil

[57] ABSTRACT

The present invention is directed to an isocyanate blend having an isocyanate group content of from about 16 to about 25% by weight and consisting essentially of:
(A) a modified isocyanate having an isocyanate group content of from about 18 to about 25% by weight and prepared by reacting 1 mole of methylenebis(phenyl isocyanate) with from about 0.1 to about 0.3 moles of a 134 to 700 molecular weight poly-1,2-propylene ether glycol, and
(B) an isocyanate having an isocyanate group content of from about 16 to about 22% by weight and prepared by reacting:
  (i) from about 40 to about 60 parts by weight of methylenebis(phenyl isocyanate),
  (ii) from 0 to about 10 parts by weight of a carbodiimide group modified methylenebis(phenyl isocyanate) having an isocyanate group content of from about 24 to about 33% by weight, and
  (iii) from about 30 to about 50 parts by weight of a polyester diol having a molecular weight of from about 1000 to about 3000, with the amounts of (i), (ii) and (iii) totalling 100 parts by weight, the weight ratio of (A) to (B) being from 10:1 to 1:10.

7 Claims, No Drawings

NOVEL ISOCYANATE BLENDS

CROSS REFERENCE TO RELATED APPLICATION

This application is a continuation application of U.S. application Ser. No. 398,201, filed on Aug. 23, 1989, now abandoned.

BACKGROUND OF THE INVENTION

Liquid, modified isocyanates produced by reacting methylenebis(phenyl isocyanate) with from about 0.1 to about 0.3 mole of a 134 to 700 molecular weight poly-1,2-propylene ether glycol are known (see, e.g., U.S. Pat. No. 3,644,457). Also known are liquid, carbodiimide group modified methylenebis(phenyl isocyanates) (see, e.g., U.S. Pat. Nos. 3,384,653 and 4,154,752).

Blends of liquid, carbodiimide group modified methylenebis(phenyl isocyanates) with various liquid prepolymers of methylenebis(phenyl isocyanate) are also described in the art (see, e.g., U.S. Patents 4,031,026, 4,065,410 and 4,321,333). Additionally, an isocyanate having an isocyanate group content of about 19% by weight and prepared by reacting (i) methylenebis(phenyl isocyanate), (ii) a carbodiimide group modified methylenebis(phenyl isocyanate) having an isocyanate group content of about 29% by weight and (iii) a 2000 molecular weight polyester diol is commercially available.

Systems are commercially available which are used in o the production of polyurethane shoe soles. In general, these systems comprise a polyether diol, a polyether triol, a chain extender (such as 1,4-butane diol or ethylene glycol), blowing agent, catalyst and surfactant. The use of so-called filled polyols in such systems is described in U.S. Pat. Nos. 4,448,903 and 4,477,602. Although these systems have met with some commercial success, when attempts are made to produce relatively low density parts (such as, e.g., densities in the range of from 0.30 to 0.45 g/cc), low temperature flex fatigue resistance is generally not satisfactory.

DESCRIPTION OF THE INVENTION

The present invention is directed to the discovery of a novel isocyanate blend which when used in shoe sole systems of the type mentioned above give marked improvement in low temperature flex resistance while substantially maintaining the excellent physical properties normally associated with such systems. More particularly, the present invention is directed to an isocyanate blend of two known isocyanates. More specifically, the present invention is directed to an isocyanate blend having an isocyanate group content of from about 16 to about 25% by weight and consisting essentially of:

(A) a modified isocyanate having an isocyanate group content of from about 18 to about 25% by weight and prepared by reacting 1 mole of methylenebis(phenyl isocyanate) with from about 0.1 to about 0.3 moles of a 134 to 700 molecular weight poly-1,2-propylene ether glycol, and (B) an isocyanate having an isocyanate group content of from about 16 to about 22% by weight and prepared by reacting:
  (i) from about 40 to about 60 parts by weight of methylenebis(phenyl isocyanate),
  (ii) from 0 to about 10 parts by weight of a carbodiimide group modified methylenebis(phenyl isocyanate) having an isocyanate group content of from about 24 to about 33% by weight, and
  (iii) from about 30 to about 50 parts by weight of a polyester diol having a molecular weight of from about 1000 to about 3000, with the amounts of (i), (ii) and (iii) totalling 100 parts by weight, the weight ratio of (A) to (B) being from 10:1 to 1:10, and preferably from 3:1 to 1:3, and most preferably from 3:1 to 1:1.

As used herein, the term, methylenebis(phenyl isocyanate), is intended to include the 2,2'-isomer, the 2,4'-isomer, the 4,4'-isomer, and mixtures thereof.

As noted earlier, the individual components making up the isocyanate blend of the invention are known. Component (A) is a modified isocyanate having an isocyanate group content of from about 18 to about 25% by weight, and preferably from about 21 to about 24% by weight, prepared by reacting 1 mole of methylenebis(phenyl isocyanate) with from about 0.1 to about 0.3 moles of a 134 to 700 molecular weight poly-1,2-propylene ether glycol. The most preferred modified isocyanate has an isocyanate group content of about 23% by weight and is prepared from the 4,4'-isomer of methylenebis(phenyl isocyanate) and tripropylene glycol. One such isocyanate which is commercially available is Mondur PF, sold by Mobay Corporation. The preparation of modified isocyanates which are useful as component (A) is described in U.S. Pat. No. 3,644,457, the disclosure of which is herein incorporated by reference.

Component (B) of the present invention is an isocyanate having an isocyanate group content of from about 16 to about 22% by weight, and preferably from about 18 to about 20% by weight, prepared by reacting:

(i) from about 40 to about 60, and preferably from about 50 to about 60 parts by weight of methylenebis(phenyl isocyanate), (ii) from 0 to about 10, and preferably from about 4 to about 8 parts by weight of a carbodiimide group modified methylenebis(phenyl isocyanate) having an isocyanate group content of from about 24 to about 33, and preferably from about 28 to about 31% by weight, and (iii) from about 30 to about 50, and preferably from about 35 to about 41 parts by weight of a polyester diol having a molecular weight of from about 1000 to about 3000, and preferably from about 1500 to about 2500, with the amounts of (i), (ii) and (iii) totalling 100 parts by weight.

The carbodiimide group modified methylenebis(phenyl isocyanates) used to prepare component B) are known in the art. The preparation of such carbodiimide modified isocyanates is described in U.S. Pat. Nos. 3,384,653 and 4,154,752, the disclosures of which are herein incorporated by reference.

The polyesters useful in preparing component (B) are also generally known in the polyurethane art. Typically, such polyesters are reaction products of dihydric alcohols and dibasic carboxylic acids. Instead of the free acid, the corresponding anhydride may be used. The acids may be aliphatic, cycloaliphatic, aromatic or heterocyclic. Useful acids include succinic acid, adipic acid, suberic acid, azelaic acid, sebacic acid, phthalic acid, isophthalic acid and the like. Useful dihydric alcohols include ethylene glycol, 1,2- and 1,3-propylene glycol, 1,4- and 2,3-butane diol, 1,6-hexane diol, 1,8-octane diol, neopentyl glycol, cyclohexanedimethanol and the like.

The most preferred component B) is an isocyanate having an isocyanate group content of about 19% by weight prepared by reacting:

(i) 56 parts by weight of the 4,4'-isomer of methylenebis(phenyl isocyanate), (ii) 6 parts by weight of a carbodiimide modified methylenebis(phenyl isocyanate) having an isocyanate group content of 29.3% and a viscosity at 25° C. of less than 100 mPa.s (and commercially available from Mobay Corporation as Mondur CD), and (iii) 38 parts by weight of a 2000 molecular weight polyester diol prepared by reacting adipic acid, 1,4-butane diol and ethylene glycol (ethylene glycol to butane diol molar ratio of about 1:1). This preferred isocyanate component (B) is commercially available from Mobay Corporation as Mondur E-501.

The isocyanates of the present invention are useful in the preparation of shoe soles. The isocyanates are reacted with relatively high molecular weight polyols and chain extenders in the presence of blowing agents and optionally, catalysts and surfactants. It is preferred to use isocyanate reactive systems of the type known and described in U.S. Pat. Nos. 4,448,903 and 4,477,602, the disclosures of which are herein incorporated by reference.

The invention is further illustrated but is not intended to be limited by the following examples in which all parts and percentages are by weight unless otherwise specified.

EXAMPLES

Examples 1 through 6

An isocyanate reactive composition was prepared by blending the following components:

69.26 parts by weight polyether diol having an OH number of about 28 and prepared by reacting propylene glycol, propylene oxide and ethylene oxide (weight ratio of propylene to ethylene oxide about 4:1), and containing 91% primary hydroxyl groups;

13.80 parts by weight a dispersion having an OH number of about 28 and consisting of a polyhydrazodicarbonamide in a glycerin initiated propylene oxide/ethylene oxide polyether (having an OH number of 35) and produced by reacting toluene diisocyanate and hydrazine in the presence of the polyether according to U.S. Pat. No. 4,042,537; the dispersion has a solids content of 20% by weight;

7.67 parts by weight 1,4-butane diol;
2.40 parts by weight Dabco HB, a catalyst available from Air Products;
0.03 parts by weight dibutyltin dilaurate;
0.10 parts by weight L5810, a surfactant available from Union Carbide;
0.08 parts by weight of a commercially available polydimethylsiloxane having a viscosity of 15,500 to 19,500 cps at 25° C.;
6.34 parts by weight R-11-B, a stabilized monofluorotrichloromethane available from Pennwalt; and,
0.32 parts by weight water.

In these examples, the following isocyanates were used either alone or in combination in the weight ratios set forth in Table 1. The isocyanates were:

(A) a modified isocyanate having an isocyanate group content of about 23% by weight, prepared by reacting the 4,4'isomer of methylenebis(phenyl isocyanate) with tripropylene glycol; and (B) an isocyanate having an isocyanate group content of about 19% by weight prepared by reacting:

(i) 56 parts by weight of the 4,4'-isomer of methylenebis(phenyl isocyanate), (ii) 6 parts by weight of a carbodiimide modified methylenebis(phenyl isocyanate) having an isocyanate group content of 29.3% and a viscosity at 25° C. of less than 100 mPa.s (and commercially available from Mobay Corporation as Mondur CD), and (iii) 38 parts by weight of a 2000 molecular weight polyester diol prepared by reacting adipic acid, 1,4-butane diol and ethylene glycol (ethylene glycol to butane diol molar ratio of about 1:1).

These examples were carried using a DESMA PSA 90/91 machine, a typical low pressure polyurethane shoe sole machine under the following process conditions:

(a) temperatures of the isocyanate components and the isocyanate reactive components: 77±3° F.;
(b) mold temperature: 110±5° F.;
(c) throughput:50 to 60 g/sec.
(d) isocyanate index: 98

The liquid reaction mixture was quickly poured into a 0.25"×6"×6" plaque mold, and demolded after about 3 minutes. All parts were molded at a density of about 0.46 g/cc. Rossflex was measured according to ASTM D-1052. The parts were also tested for Shore A hardness (ASTM D-2240), tensile strength and elongation at break(ASTM D-412), split tear (ASTM D-3574, test F) and Die C tear (ASTM D-624).

Examples 1 and 6 are comparative examples. The results were as reported in Table 1.

TABLE 1

| Example | ISO | SHORE A HARDNESS | ROSS FLEX −20° F. (cycles × 10$^3$) | SPLIT TEAR (pli) | DIE C TEAR (pli) | TENSILE (psi) | ELONGATION (%) |
|---|---|---|---|---|---|---|---|
| 1 | A | 49 | 31 | 23.4 | 82.2 | 425.7 | 390 |
| 2 | A:B 9:1 | 49 | 54 | 20.3 | 88.8 | 380.9 | 350 |
| 3 | A:B 3:1 | 48 | 107 | 23.8 | 77.1 | 310.1 | 340 |
| 4 | A:B 1:1 | 46 | 190 | 20.6 | 73.3 | 297.4 | 340 |
| 5 | A:B 1:9 | 35 | 136 | 19.1 | 51.2 | 163.3 | 210 |
| 6 | B | 35 | 126 | 19.1 | 44.2 | 136.0 | 160 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate blend having an isocyanate group content of from about 16 to about 25% by weight and consisting essentially of:
   (A) a modified isocyanate having an isocyanate group content of from about 18 to about 25% by weight and prepared by reacting 1 mole of methylenebis(phenyl isocyanate) with from about 0.1 to about 0.3 moles of a 134 to 700 molecular weight poly-1,2-propylene ether glycol, and
   (B) an isocyanate having an isocyanate group content of from about 16 to about 22% by weight and prepared by reacting:
      (i) from about 50 to about 60 parts by weight of methylenebis(phenyl isocyanate),
      (ii) from about 4 to about 8 parts by weight of a carbodiimide group modified methylenebis(phenyl) isocyanate) having an isocyanate group content of from about 28 to about 31% by weight, and
      (iii) from about 35 to about 41 parts by weight of a polyester diol having a molecular weight of from about 1000 to about 3000, with the amounts of (i), (ii) and (iii) totaling 100 parts by weight, the weight ratio of (A) to (B) being from 10:1 to 1:10.

2. The isocyanate blend of claim 1 wherein the weight ratio of (A) to (B) is from 3:0 to 1:3.

3. The isocyanate blend of claim 2 wherein the weight ratio of (A) to (B) is from 3:1 to 1:1.

4. The isocyanate blend of claim 1 wherein component (A) has an isocyanate group content of from about 21 to about 24% by weight.

5. The isocyanate blend of claim 1 wherein component (B) has an isocyanate group content of from about 18 to about 20% by weight.

6. The isocyanate blend of claim 1, wherein said polyester diol has a molecular weight of from about 1500 to about 2500.

7. The isocyanate blend of claim 5, wherein component (B) is prepared by reacting:
   (i) 56 parts by weight of methylenebis(phenyl isocyanate),
   (ii) 6 parts by weight of a carbodiimide group modified methylenebis(phenyl isocyanate) having an isocyanate group content of 29.3% by weight, and
   (iii) 38 parts by weight of 2000 molecular weight polyester diol prepared by reacting adipic acid, 1,4-butane diol and ethylene glycol at a butane diol to ethylene glycol molar ratio of about 1:1.

* * * * *